US007808709B2

(12) United States Patent
Jacobowitz et al.

(10) Patent No.: US 7,808,709 B2
(45) Date of Patent: Oct. 5, 2010

(54) INJECTION MOLDED MICROLENSES FOR OPTICAL INTERCONNECTS

(75) Inventors: Lawrence Jacobowitz, Wappingers Falls, NY (US); Casimer DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/122,949

(22) Filed: May 19, 2008

(65) Prior Publication Data

US 2008/0218869 A1 Sep. 11, 2008

Related U.S. Application Data

(63) Continuation of application No. 11/849,680, filed on Sep. 4, 2007, now Pat. No. 7,446,942, which is a continuation of application No. 11/195,150, filed on Aug. 2, 2005, now Pat. No. 7,295,375.

(51) Int. Cl.
G02B 27/10 (2006.01)
G02B 5/18 (2006.01)
G02B 3/00 (2006.01)
B29D 11/00 (2006.01)

(52) U.S. Cl. ............ 359/619; 359/558; 359/642; 359/900; 216/26

(58) Field of Classification Search .......... 359/558, 359/619, 620, 642, 900; 216/26, 41
See application file for complete search history.

(56) References Cited

U.S. PATENT DOCUMENTS 5,453,876 A 9/1995 Hamada

| 5,850,276 | A | 12/1998 | Ochi et al. |
|---|---|---|---|
| 6,235,141 | B1 | 5/2001 | Feldman et al. |
| 6,328,482 | B1 | 12/2001 | Jian |
| 6,669,801 | B2 | 12/2003 | Yoshimura et al. |
| 6,894,840 | B2 | 5/2005 | Yamanaka et al. |
| 7,295,374 | B2 * | 11/2007 | Chang et al. ............ 359/619 |
| 2006/0187379 | A1 | 8/2006 | Yamanaka et al. |

FOREIGN PATENT DOCUMENTS

| CN | 1161519 | 10/1997 |
|---|---|---|
| CN | 1477409 | 2/2004 |
| EP | 1 022 108 A1 | 7/2000 |
| EP | 1 460 738 A2 | 9/2004 |
| JP | 59-040543 A | 3/1984 |
| WO | WO 99/08348 | 2/1999 |

* cited by examiner

*Primary Examiner*—Jack Dinh
(74) *Attorney, Agent, or Firm*—Scully, Scott, Murphy & Pressner, P.C.; Louis J. Percello, Esq.

(57) ABSTRACT

Disclosed are a microlens array, and a method of positioning and aligning the microlens array on another device. Generally, the microlens array comprises an array of injection molded microlens elements, and a supporting flange. Each of the microlens elements has a generally spheroid or spherical shape, and the supporting flange connects together the array of microlens elements to facilitate positioning that array of lenses on a printed circuit board, semiconductor package or wafer. This array is well suited for use with vertical cavity surface emitting lasers (VCSELs); and, in particular, the preferred embodiment of the invention addresses the problem of VCSEL laser array alignment by using arrays of microlenses elements fabricated by injection molding.

2 Claims, 6 Drawing Sheets

INJECTION MOLDED MICROLENSES FOR OPTICAL INTERCONNECTS

CROSS REFERENCE TO RELATED APPLICATIONS

This application is a continuation of U.S. application Ser. No. 11/849,680 filed Sep. 4, 2007, which is a continuation of co-pending U.S. application Ser. No. 11/195,150 filed Aug. 2, 2005, the entire contents of which are incorporated herein by reference.

BACKGROUND OF THE INVENTION

1. Field of the Invention

This invention generally relates to microlenses, and more specifically, the invention relates to injection molded microlenses that are particularly well suited for optical interconnects.

2. Background Art

There has been recent interest in the development of higher bandwidth fiber optic interconnects for a variety of server and storage applications. For example, optical transmitter arrays comprised of vertical cavity surface emitting lasers (VCSELs) are commercially available, with up to 12 lasers per array on a 250 micron pitch. These devices are interconnected with similar arrays of photodetectors using ribbons of optical fiber to form parallel optical interconnects (POI). These devices are available from a number of companies, including Agilent, Tyco, Emcore, Picolight, and Xanoptix. These devices may be used, for example, on high end technical computers as part of the clustering fabric between switches; this enables higher bandwidth, and longer distance links, which are essential to building large server, clusters. Smaller versions of POI, with only 4 optical elements per array, are also used in high volumes for I/O applications, and other uses are being developed for future clustering applications of this technology. Various widths of POI have been standardized, including 4×, 8×, and 12× arrays at data rates ranging from 2.5 Gbit/s/line to 5 Gbit/s/line. More advanced applications are also under consideration, including direct integration of VCSEL arrays into dual chip and multi-chip modules.

POI offers many technical advantages, including significantly higher bandwidths and many times the distance of copper links; immunity to electromagnetic interference; smaller, denser packaging; and lighter weight, more flexible cable assemblies. A significant inhibitor to the wider adoption of these links has been the relatively high cost compared with copper alternatives; consequently, POI is only used today in applications which are either insensitive to cost or which require a combination of distance and bandwidth that cannot be achieved any other way. Cost reductions for POI would thus be highly desirable.

A major cost component in POI is the active alignment required between an array of lasers and a corresponding array of optical fibers. It has been estimated that fabrication of such microlens elements is currently a $1 B market opportunity, and growing larger in the coming years. The goal is to launch infrared radiation (typical wavelengths near 850 nm) from the VCSEL aperture (initially 2-3 microns diameter) into the fiber core (typically 50 microns diameter) as efficiently as possible with the lowest cost. Positioning the fiber core directly against the laser aperture (butt coupling) is not practical because the laser beam from a VCSEL has very high divergence; it is not possible using standard optical array connectors (such as the MPO) to bring the fibers sufficiently close to the laser aperture. Even if this was possible and the beam diameter was smaller than the fiber core, losses would still occur due to a mismatch with the fiber's numerical aperture (part of the beam may still exceed the acceptance angle of the fiber and would not be guided).

An object of this invention is to enable wafer-scale manufacturing and electronic integration with optical components.

For this reason, all practical VCSEL arrays employ some form of lens structure to facilitate coupling light into the fiber array. This problem is significantly more complex than alignment of a single laser and fiber, due to effects such as cumulative tolerance runout in the lens and VCSEL designs. Conventional lens elements can be fabricated separately (for example, spherical or ball lenses made of glass), then manually aligned with elements in the VCSEL array; this is not a low cost manufacturing process, and uniformity of the coupled optical power is not well controlled across the array. There is also high manufacturing fallout from the failure to properly align lasers and lenses, or the failure of a laser array element after alignment, which is an important reason for the high costs encountered today. Thus, there is an industry need for a low cost, high volume fabrication method for VCSEL array lenses, and a low cost assembly/alignment procedure for attaching these lenses into a VCSEL package.

SUMMARY OF THE INVENTION

An object of this invention is to enable printed circuit board and wafer-scale manufacturing and electronic integration with optical components.

An object of this invention is to provide an improved microlens array.

Another object of the present invention is to provide a low cost alignment procedure for attaching micro lenses on a printed circuit board or semiconductor package or wafer.

A further object of the invention is to address the problem of VCSEL laser array alignment using arrays of microlens elements fabricated by injection molding.

These and other objectives are attained with a microlens array, and a method of positioning and aligning the microlens array on another device. Generally, the microlens array comprises an array of injection molded microlens elements, and a supporting flange. Each of the microlens elements has a generally conic cross-section surface of revolution, which may be spheroidal, ellipsoidal, or cylindrical shape, and the supporting flange connects together the array of microlens elements to facilitate positioning that array of lenses. This array is well suited for use with vertical cavity surface emitting lasers (VCSELs); and, in particular, the preferred embodiment of the invention addresses the problem of VCSEL laser array alignment by using arrays of microlenses elements fabricated by injection molding.

The preferred embodiment of the invention allows for fabrication of lens arrays in a singe process step, including features such as anti-reflection facets on the lens assembly. The molding process may be modified to allow fabrication of flanges between lens elements with the same high tolerances as the lens surfaces. The entire lens array may be aligned with lithographic precision to the VCSELs, eliminating some of the most time-consuming and costly steps in the current art. This process also enables wafer-scale test of the resulting VCSEL array, further reducing cost and improving yield. Additional molding features and additional uses for molded microlenses are described in copending patent application Ser No. 11/195,147 for "Injection Molded Microoptics," filed herewith, the disclosure of which is hereby incorporated herein by reference in its entirety.

In another aspect of this invention, a method is provided for forming a diffractive lens structure. This method comprises the steps of providing a mold plate, patterning a set of rings arrayed across the mold plate, and opening spaces between the rings, wherein the rings become an in-situ mask on the mold plate. The method comprises the further steps of directing an optical polymer into the spaces between the rings, polymerizing said optical polymer to form an array of ring lenses, and transferring the array of ring lenses to a substrate.

Preferably, the providing step includes the step of providing the mold plate with a layer of photoresist deposited thereon; the patterning step includes the step of using a photolithography system including a mask of alternating dark and light rings, which correspondingly transmit and occlude light, to pattern the set of rings arrayed across the mold plate. Also, with the preferred embodiment, the directing step includes the step of injecting the optical polymer into the spaces between the rings, the opening step includes the step of developing and washing the patterned arrays to open said spaces between the rings. This preferred method may also comprise the further steps of applying a release layer to conformally coat the sidewalls of the ring-etched structure, and forming alignment marks on the mold plate to facilitate aligning the mold plate to said substrate.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

The present invention, generally, relates to a microlens array, and to a method of positioning and aligning the microlens array on another device. Generally, the microlens array comprises an array of injection molded microlens elements, and a supporting flange. Each of the microlens elements has a generally spheroidal, ellipsoidal, or cylindrical shape, and the supporting flange connects together the array of microlens elements to facilitate positioning that array of lenses. This array is well suited for use with vertical cavity surface emitting lasers (VCSELs); and, in particular, the preferred embodiment of the invention addresses the problem of VCSEL laser array alignment by using arrays of microlens elements fabricated by injection molding.

Since VCSELs emit an approximately circular cross-section beam, a circular symmetric lens or an anomorphic lens may be used in this application. A typical VCSEL beam with 15-20 degrees divergence needs to be coupled into a fiber core with an acceptance angle as low as 6 degrees. However, the resulting optical subassembly must also be eye safe, compliant with international laser safety regulations (IEC 825). The preferred laser product classification is Class 1, or inherently safe for viewing by untrained personnel without the aid of magnifying optics. One way to achieve this is by using the lens to control divergence of the beam, which reduces the energy density of the accessible laser radiation reaching the eye from an open VCSEL transmitter port. Partially collimating the beam with a microlens offers the ability to maximize coupled power without sacrificing eye safety. The curvature of the lens should allow placement in the near field of the VCSEL to minimize effects of VCSEL divergence variations. These principles are illustrated by the attached figures.

Figure 1:
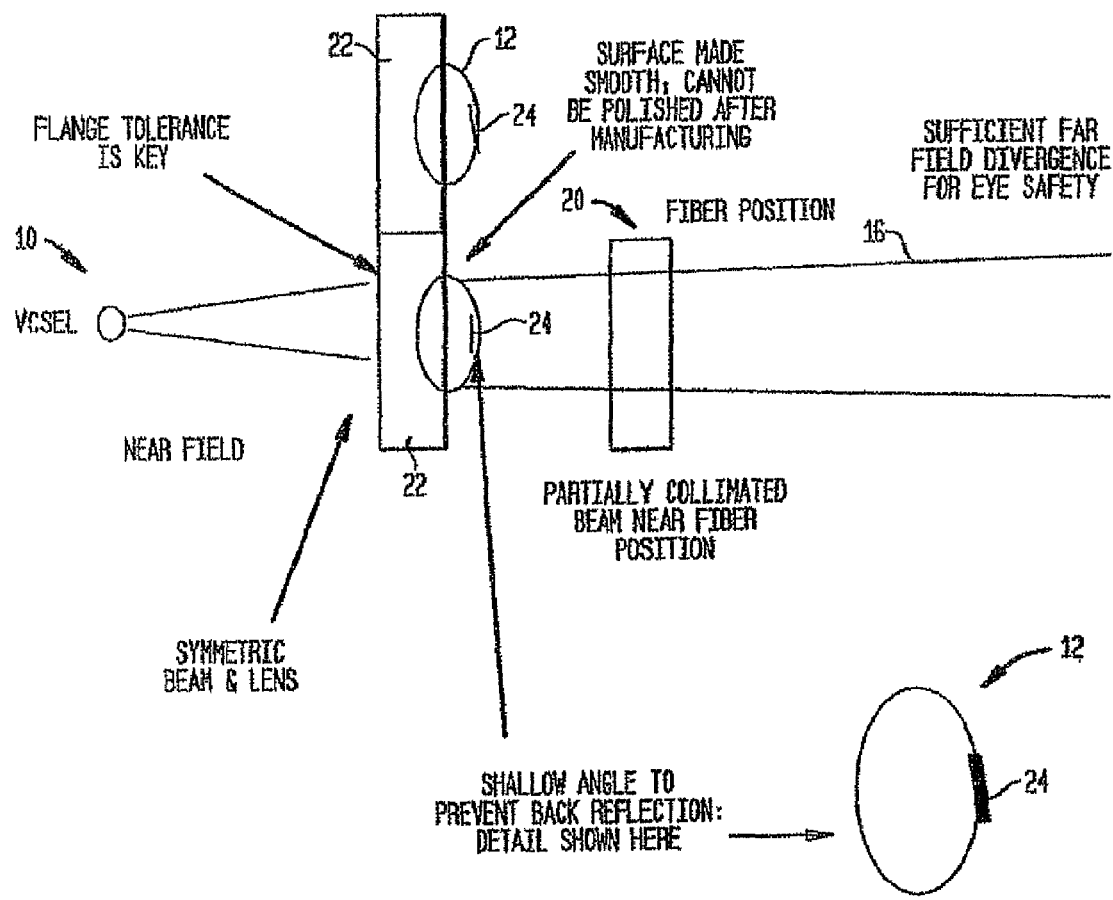
FIG. 1 shows a vertical cavity surface emitting lasers (VCSELs) with which this invention may be used.

More specifically, FIG. 1 illustrates a VCSEL 10, a pair of lenses 12, 14 a partially collimated laser beam 16, and an optical fiber, represented at 20. In the arrangement of FIG. 1, the lens element 12 is attached to a support flange 22 in this example; the tolerances of the flange inner diameter is preferably very low in order to facilitate coupling of the lens arrays. The use of a flange 22 such as this facilitates assembly of the microlens array inside the same package as the VCSEL array, forming an integrated optical transceiver subassembly. The tolerance of the flange 20 and lens elements 12, 14 causes optical power variations of 25% or more if the connector position is misaligned by less than 1 micron. Thus, the means used to fabricate the microlens array preferably preserves low tolerances and minimizes array runout. Because of their small size, microlenses 12, 14 cannot be polished using conventional methods; the fabrication process preferably results in a surface sufficiently smooth for optical applications. Finally, the microlens preferably minimizes back reflections of light into the laser, which causes instabilities known as reflection-induced intensity noise and degrades bit error rate. A slight flattening 24 at the lens apex, at a shallow angle (4-6 degrees), may be used to minimize back reflected light.

Figure 2:
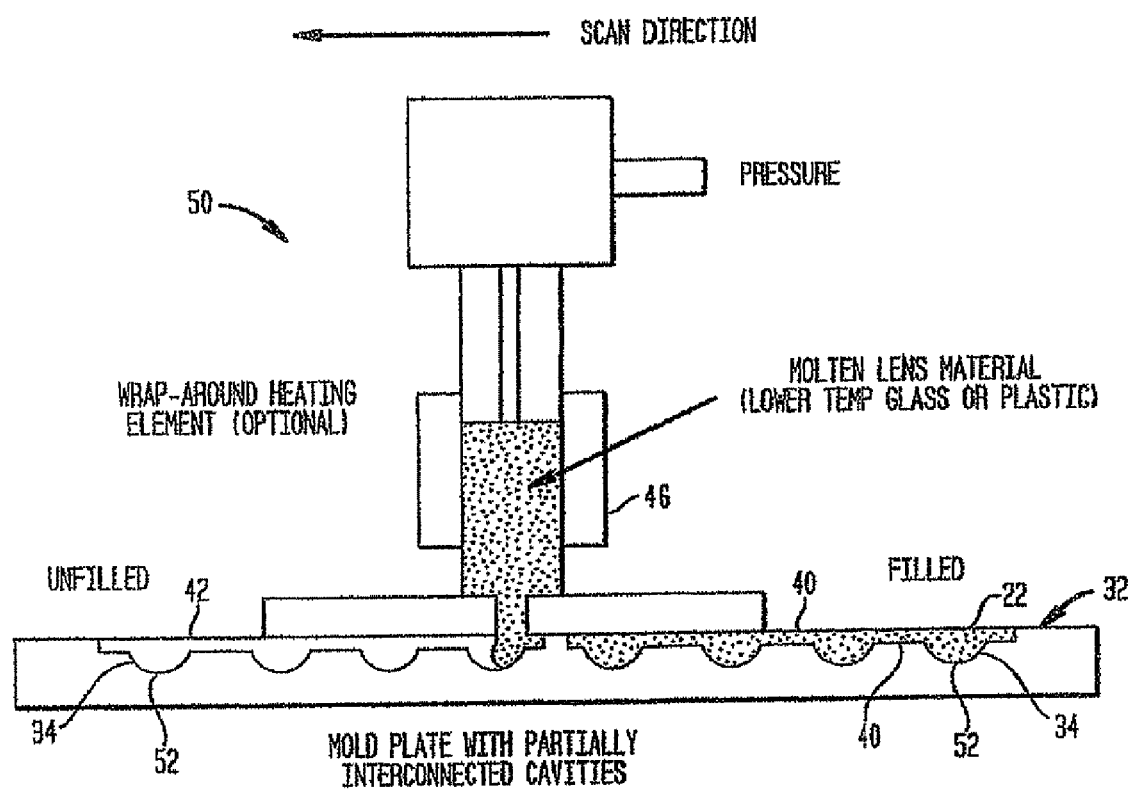
FIG. 2 illustrates an assembly for molding an array of microlenses.
Figure 3:
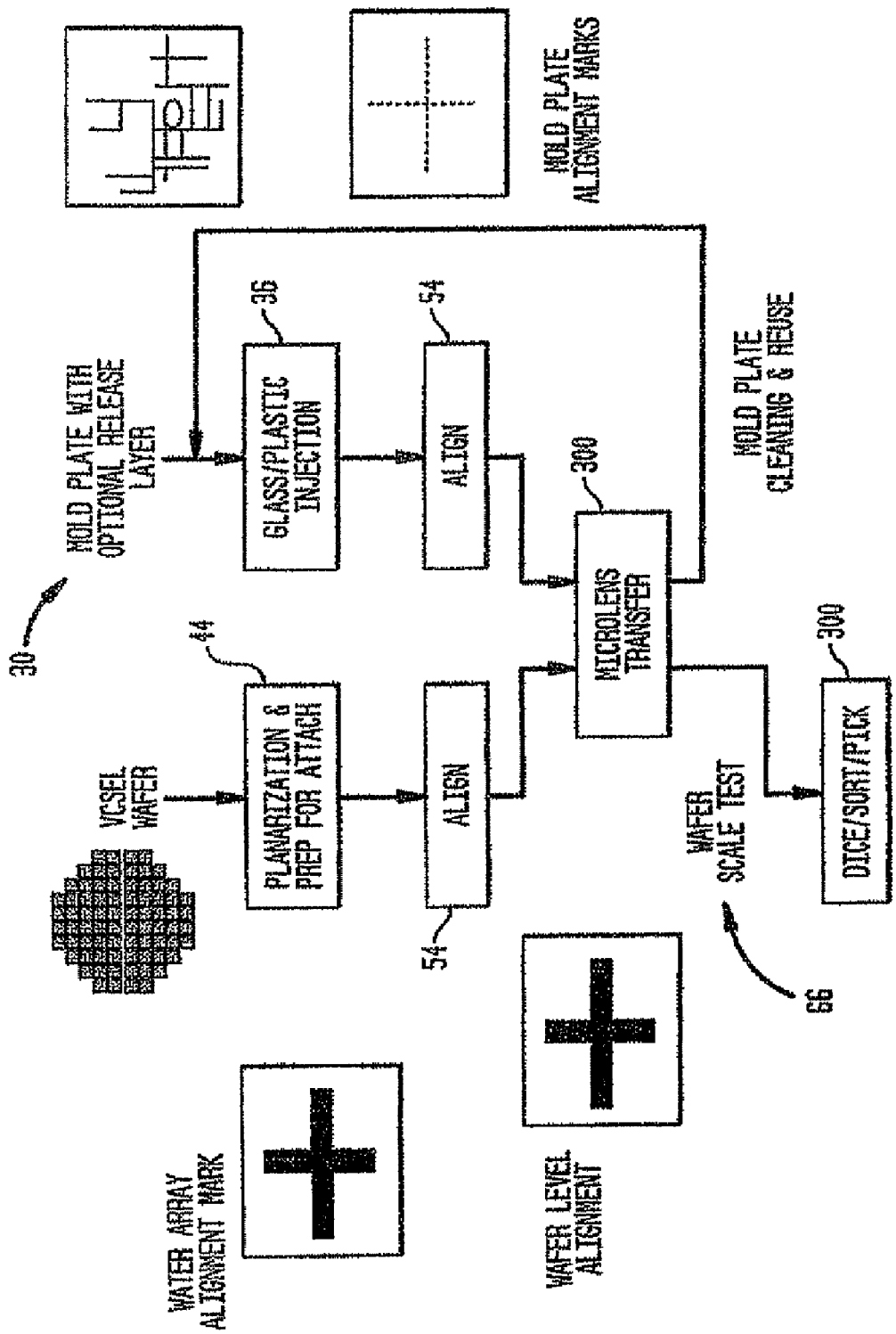
FIG. 3 is a process diagram generally outlining a procedure for molding an array of microlenses and then transferring the lenses onto a semiconductor wafer.

With the preferred embodiment of the present invention, VSCEL lens arrays having these properties are fabricated using an injection molding technique, as illustrated in FIGS. 2 and 3. With reference to these Figures, first, as represented at 30, a metal molding plate 32 such as metal, silicon graphite, glass, etc., is designed with an array of cavities 34 that have the desired radius of curvature for the VCSEL microlens system. If the mold plate is used for lower temperature lens materials, it may be fabricated out of silicon. The mold plate 32 can be designed with an arbitrary surface curvature in the cavities, facilitating the design of partially collimating lenses for laser eye safety. The resulting lens elements will be closely spatially matched to the dimensions of the VCSEL elements; variations in the lens spacing or curvature facilitates spatial transforms to other fiber pitches, as well as the use of different fiber core diameters/numerical apertures.

As represented at 36, this mold plate 32 is filled with a suitable lens material 40, such as low temperature (in the range from 100° C. to 150° C.) glass or plastic, which has a moderately low melting point (in the range from 150° C. to 250° C.) and suitable refractive index (in the range from 1.3 to 3.3). Using selected wavelength(s) of actinic illumination, photopolymerization to a specific degree enables tuning the refractive index of the microlens array, either in situ in the mold cavities or post-transfer to the target device array. Alternately, with special processing steps any type of higher melting point glass could be accommodated for additional cost. Depending on the material choice, the mold may first be coated with an optional release layer (such as Teflon) to facilitate de-molding of the microlenses; in the case of microlens arrays, the top surface of the substrate may also be coated with a release layer. Note that a release layer may also be applied to the lens flange region to facilitate removal of the lens array. The mold plate 32 is filled with molten lens material; preferably, the lens flange 22 connecting multiple array elements is fabricated at the same time by leaving a connection 42 in the mold plate between adjacent lens elements (which may also be coated with the Teflon release layer). This provides for tight control of the flange tolerances. Alternately, as represented at step 44 in FIG. 3, the VCSEL surface may be molded or machined in a separate operation to form a conjugate, conformal surface which would mate with the flange 22 to facilitate passive self-alignment of the VCSEL and lens array in the near field of the VCSELs.

The pressure feed for the lens material 40 may need to be regulated in order to uniformly fill both the deep lens cavity 34 and the shallow connecting flange 42. To facilitate this, it may be desirable to maintain the lens material melt at a sufficiently high temperature (in the range from 150° C. to 300° C.) so that it remains fluid until an entire lens array is filled, rather than beginning to cool before the entire array is complete (which may lead to thermal imbalance and cracking); an optional heating element 46 is shown wrapped around the injection tool 50 for this purpose. Alternately, the speed of the scan of the injection tool across the mold plate 32 may be varied so that the injection tool passes more quickly over thinner areas of the substrate (such as those along the flange or between the lens elements). An optional digital microcontroller (not shown) may be interfaced with a scan position controller for this purpose. The mold cavity 34 can be designed with a slight flattening 52 at the lens apex and a shallow angle, to minimize back reflected light. Alternately, the lens apex may undergo reactive ion etching (RIE) to fabricate this feature.

Figure 4:
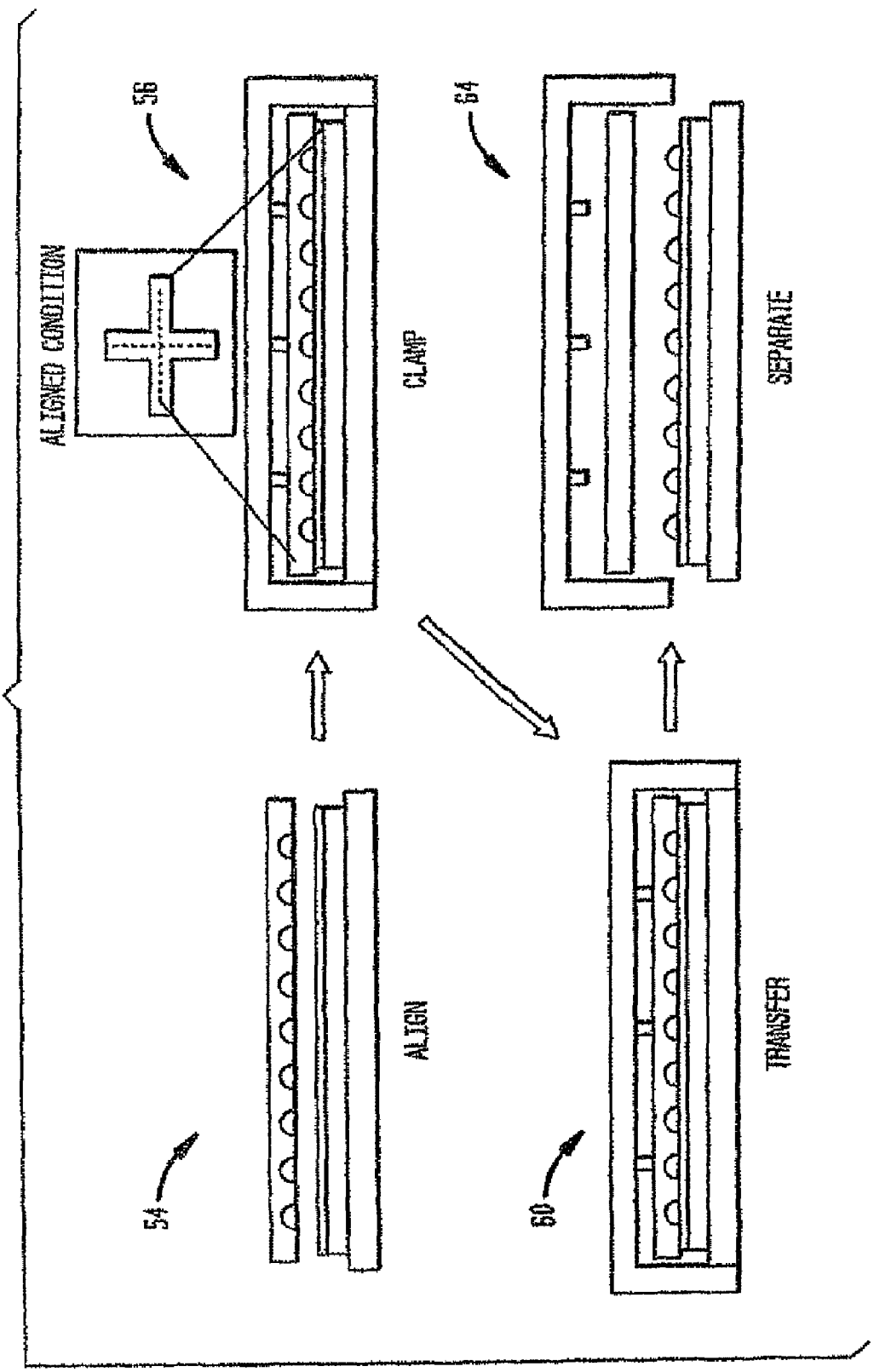
FIG. 4 illustrates a procedure for aligning and clamping a microlens array to a semiconductor wafer.

The mold plate 32 preferably contains alignment markings to facilitate positioning and removal of the microlens arrays. Complementary markings are provided on the VCSEL wafer, etched into the substrate at either end of the other array or otherwise provided; these markings may be implemented with lithographic precision. The alignment of the VCSEL array to the lens array, represented at 54 in FIGS. 3 and 4, may be done using an optical inspection technique under visible light; there is no requirement for manual adjustment of the lens array. The process involves inverting or flipping the lens array onto the VCSEL wafer; inspecting & aligning the markings on the lenses and VCSELs; clamping or holding in fixed position the mold plates in the aligned position, as represented at 56; transferring 60 the microlens array onto the VCSEL surface, separating the lens/flange release layer, as represented at 62; and, as represented at 64, removing the mold plate for cleaning and reuse, leaving the lens array affixed in place with either optical epoxy, index matching gel, or similar agents.

Figure 5:
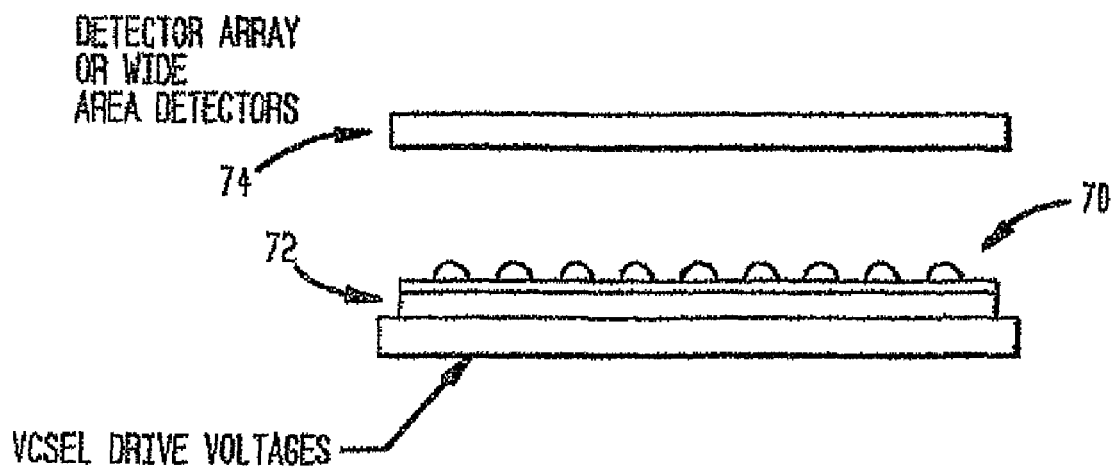
FIG. 5 shows a procedure for inspecting a semiconductor wafer that is provided with an array of microlenses.

This enables wafer-scale testing 66 of the VCSEL-lens array. With reference to FIG. 5, the lens elements 70 may be attached before the VCSEL wafer 72 is diced, and electrical probes are used to apply voltage to the wafer scale VCSEL elements and produce light output. The optical properties of the laser-lens array, sensed by any suitable sensor or detector, represented at 74, may be characterized on an integrated wafer scale, saving considerable cost in manufacturing test.

An alternate technique may be used for controlling high levels of laser light back reflection. By slightly tilting the mold plate 32 while the lens material 40 is still melted, the top surface of the lens array can be made to flow into a very shallow angle (a few degrees). If the mold is held in a tilted position until the lens material hardens, it is possible to form an array with lenses on one side and a back-reflection angle on the other side across the entire lens array. For applications in which high levels of back reflection are anticipated, or in which back reflection would be much larger than the original transmitted beam aperture, this prevents excess light reflected off-axis of the microlens from returning to the laser aperture.

Additional molding features and additional uses for molded microlenses are described in copending patent application Ser. No. 11/195,147 for "Injection Molded Microoptics," filed herewith, the disclosure of which is hereby incorporated herein by reference in its entirety.

Figure 6:
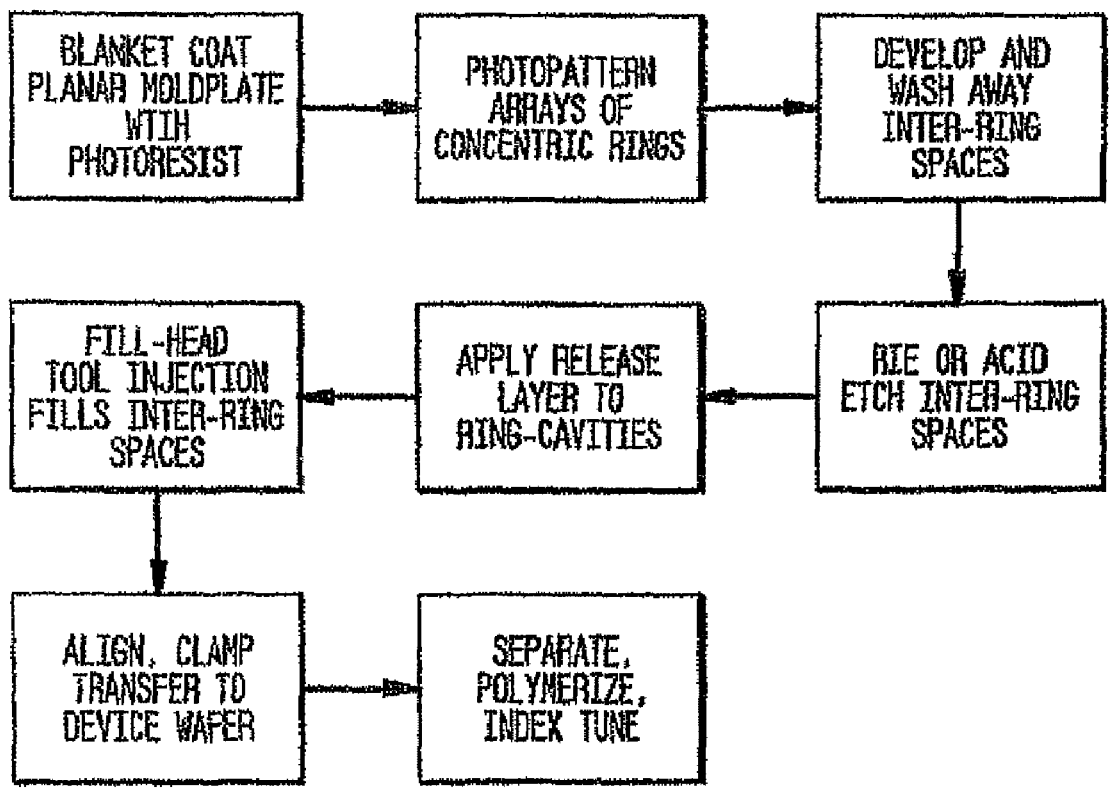
FIG. 6 shows a process for forming an injection molded diffractive lens structure.
Figure 7:
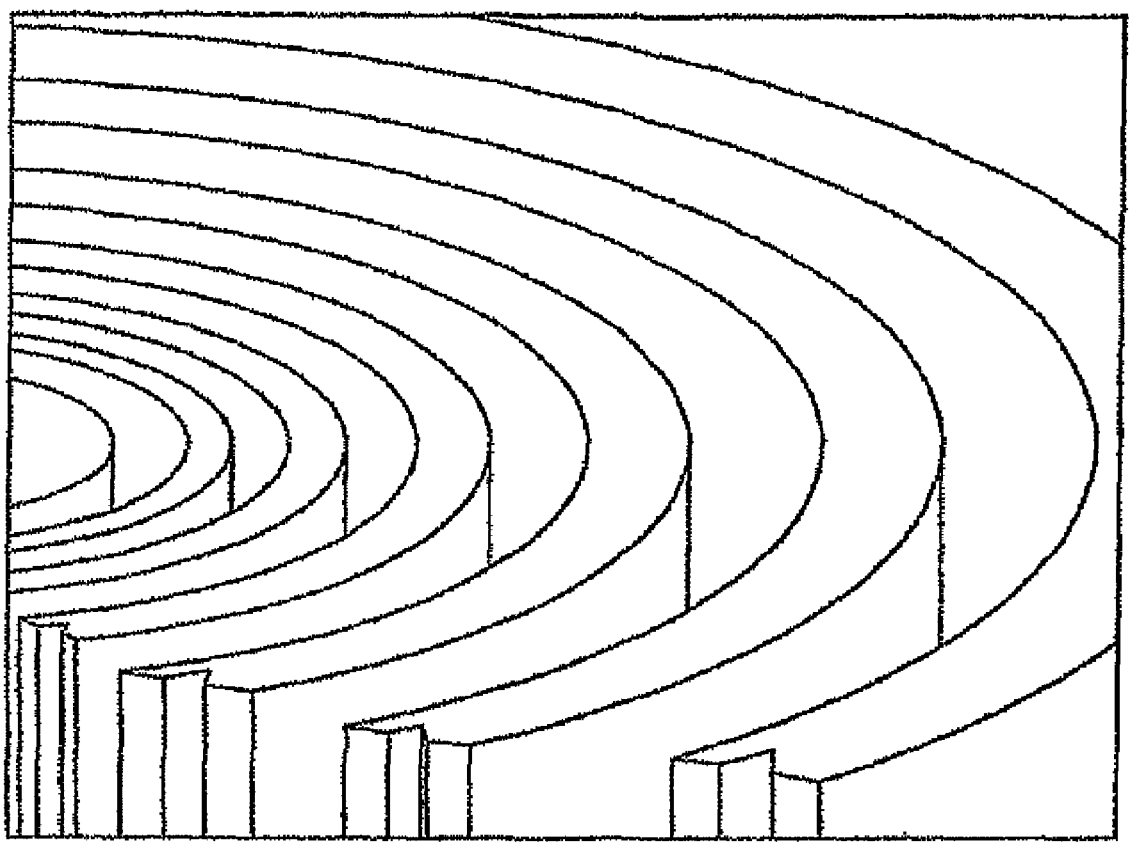
FIG. 7 illustrates a cross sectional view of a diffractive lens formed using the process of FIG. 6.

The flow-chart in FIG. 6 depicts the ordered process sequence for forming a Fresnel zone plate diffractive lens structure. At step 80, a suitable mold plate or template material, such as an optically flat borosilicate glass plate, has deposited on t a blanket layer of photoresist. At step 82, a projection photolithography system using a mask of alternating dark-light rings, which correspondingly transmit or occlude light, photopatterns a set of concentric rings or annuli arrayed across the template. At step 84, subsequent development and washing of the patterned array, opens the inter-ring spaces. The rings are now an in-situ mask for reactive ion etching, RIE, or hydrofluoric acid or other suitable wet-etching, of the mold plate, which is done at step 86. To assure detachment of the injection molding optical polymers of low melting point (less than 300° C.) glasses which will be used to fill the ring-cavity array, a release layer is, at step 90, applied to conformally coat the sidewalls of the concentric ring etched structure. At step 92, the fill tool then injects the optical polymer into the ring-cavities. Photolithographic alignment keys are concurrently formed during the ring patterning and etch steps, positioned appropriately on the mold plate for optimum alignment to conjugate alignment marks located in corresponding positions on the device wafer or substrate on which the injection-molded concentric ring arrays will be transferred. At step 94, alignment, clamping and transfer of the photopolymer ring lenses is then completed. At step 96, separation and subsequent illumination by a light source having a spectral content which will be absorbed by the photopolymer will induce photopolymerization to cross-link the ring-lens material into a harder, more durable state, and, simultaneously can be used to fine tune the index of refraction of the diffractive lens or Fresnel.zone plate. In addition, the RIE conditions may be adjusted to achieve a degree of anisotropy by adjusting the RIE chamber pressure or gas composition to allow some faceting or blazing of the ring surfaces comprising the diffractive lenses. FIG. 7 illustrates the cross-sectional view of the diffractive lens.

By applying the very precise technique of photolithographic alignment using fiducial marks, diffractive lenses may be overlayed directly onto VCSEL junctions to achieve ideal high coupling efficiency in the laser's near field. The present invention thus teaches the wafer-scale alignment and attachment of coupling either refractive or diffractive lens to the emitting junctions of VCSEL devices, and, is readily extended to similar attachments to MEMS device arrays of MEMS wafers, or, combinations of VCSEL and MEMS configurations.

The fundamental Physical Optics condition to be satisfied to form a zone plate is that the alternative transmissive and absorptive or reflective rings have diameters such as to make a periodic function of the peaks and nulls resulting from a specified amplitude-phase interferogram. Such conditions are well known to one skilled in the art and fully enabled by the present invention and the controlled variations of parameters such as radial step size, annular thickness, height of the annuli, blaze angle, refractive index, and reflectivity. A principal advantage of the present invention is the scalability of the diffractive microlens and its wafer-scale fabrication.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method of forming a diffractive lens structure, comprising the steps of:
    providing a mold plate;
    patterning a set of rings arrayed across the mold plate;
    opening spaces between the rings, wherein the rings become an in-situ mask on the mold plate;
    directing an optical polymer into the spaces between the rings;
    polymerizing said optical polymer to form an array of ring lenses; and
    transferring the array of ring lenses to a substrate.

2. A method according to claim 1, wherein:
    the providing step includes the step of providing the mold plate with a layer of photoresist deposited thereon;
    the patterning step includes the step of using a photolithography system including a mask of alternating dark and light rings, which correspondingly transmit and occlude light, to pattern the set of rings arrayed across the mold plate;
    the directing step includes the step of injecting the optical polymer into the spaces between the rings;
    the opening step includes the step of developing and washing the patterned arrays to open said spaces between the rings; and comprising the further steps of:
    applying a release layer to conformally coat the sidewalls of the ring-etched structure; and
    forming alignment marks on the mold plate to facilitate aligning the mold plate to said substrate.

* * * * *